United States Patent [19]

Momiyama

[11] 4,188,092
[45] Feb. 12, 1980

[54] RETROFOCUS TYPE WIDE-ANGLE OBJECTIVE LENS

[75] Inventor: Kikuo Momiyama, Yokohama, Japan

[73] Assignee: Canon Kabushiki Kaisha, Tokyo, Japan

[21] Appl. No.: 892,422

[22] Filed: Mar. 31, 1978

[30] Foreign Application Priority Data

Apr. 5, 1977 [JP] Japan .................................. 52/38690

[51] Int. Cl.² ............................................. G02B 9/64
[52] U.S. Cl. ..................................... 350/214; 350/207
[58] Field of Search ...................... 350/214, 176, 207

[56] References Cited

U.S. PATENT DOCUMENTS

| 3,870,400 | 3/1975 | Yamashita et al. | 350/214 |
| 3,924,935 | 12/1975 | Takahashi | 350/214 |
| 3,938,883 | 2/1976 | Takahashi | 350/214 |
| 3,973,832 | 8/1976 | Ogura et al. | 350/214 |
| 4,025,168 | 5/1977 | Sugiyama | 350/207 X |

*Primary Examiner*—Paul A. Sacher
*Attorney, Agent, or Firm*—Toren, McGeady and Stanger

[57] ABSTRACT

A retrofocus type lens having an angle of view at least 75° and F number 1:2.0. The lens includes a first lens group of a divergent type, a second lens group of a convergent type and a third lens group of a convergent type. The first lens group includes in the order stated a positive meniscus lens, a negative meniscus lens, a positive meniscus lens and a negative meniscus lens. The second lens group includes a positive lens which is either a single lens or consists of a positive lens and a negative lens cemented to each other and with a front convex face directed toward an object to be photographed. The third lens group includes a positive lens having a rear convex face directed toward an image of the object, a biconcave lens with its front surface radius smaller than its rear surface radius, a positive meniscus lens with a convex surface facing the image and a positive lens. The biconcave lens and the positive meniscus lens are respectively replaceable with cemented doublet lenses. The lens system is characterized in that the first lens group includes meniscus lenses arranged in the order of positive, negative, positive and negative lenses, and particularly in that the third positive meniscus lens serves effectively to correct chromatic distortion aberration and chromatic coma aberration.

5 Claims, 20 Drawing Figures

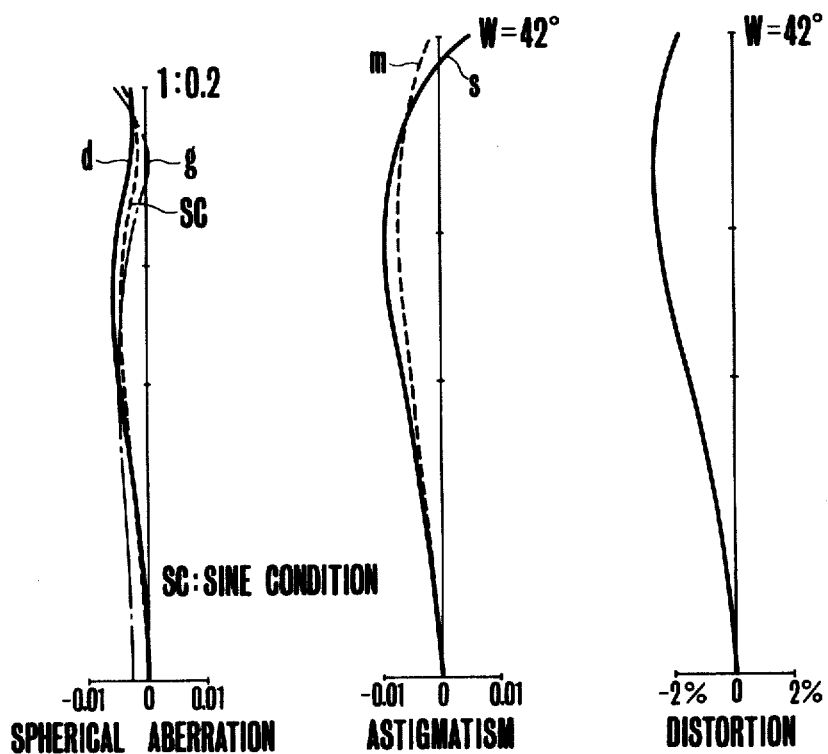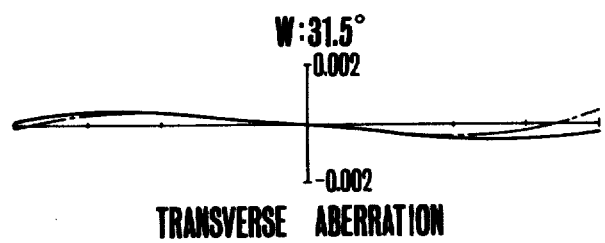

SPHERICAL ABERRATION

ASTIGMATISM

DISTORTION

TRANSVERSE ABERRATION

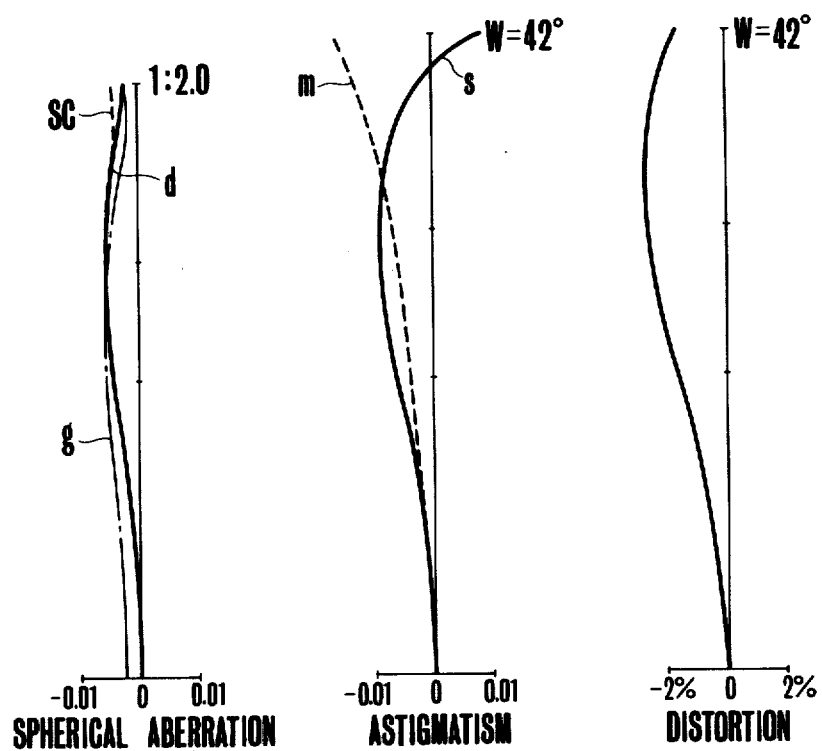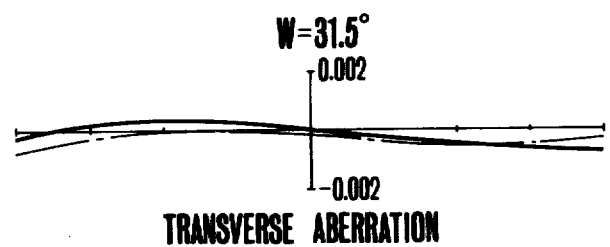

FIG.8A  FIG.8B  FIG.8C
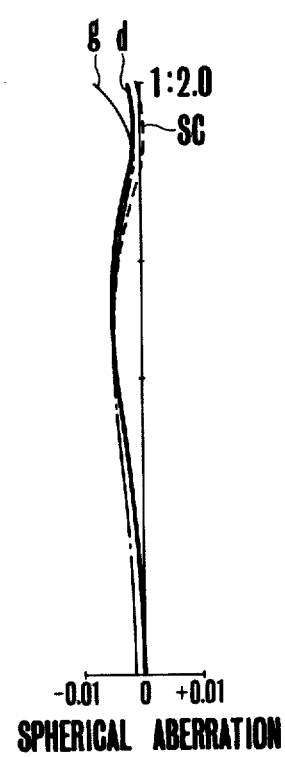
SPHERICAL ABERRATION
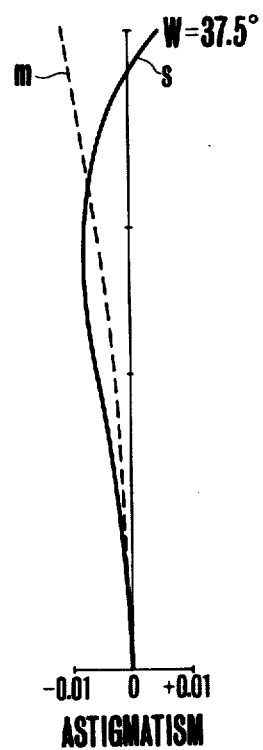
ASTIGMATISM
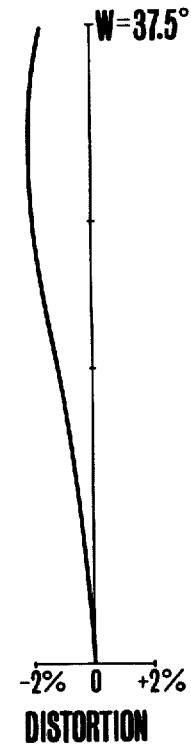
DISTORTION
FIG.8D
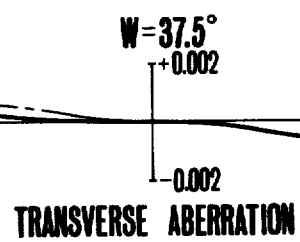
TRANSVERSE ABERRATION

RETROFOCUS TYPE WIDE-ANGLE OBJECTIVE LENS

BACKGROUND OF THE INVENTION

This invention relates to a large-aperture, wide-angle photographic lens and particularly to a lens system having a short total length.

A strong desire on the part of users of single lens reflex cameras has recently prompted attempts to construct wide-angle or ultra-wide-angle lenses which are more compact and yet have larger apertures than hitherto available Wide-angle lenses for single lens reflex cameras generally utilize a so called retrofocus arrangement. A characteristic of this type of photographic lens is that the symmetry of the lens is impaired when the lens permits a long back focal distance. This makes it difficult to correct aberrations in such lenses. The difficulty tends to increase as the lens construction incorporates a wider angle of view, a larger aperture and a smaller size.

The most difficult problem in reducing the size of a retrofocus type wide-angle lens lies in correcting the distortion in the divergent lens group at the object end of the lens. Such aberration can be effectively corrected by including a positive lens in the divergent lens group. The typical lens arrangements in such a divergent lens group include the following two: In one lens arrangement, a negative lens is disposed at the object end of the lens arrangement and a positive lens positioned behind the negative lens. In the other lens arrangement, a positive lens is disposed in one position and a negative lens arranged behind the positive lens. Because the incident height and the incident angle of light rays relative to the optical axis of the positive lens that acts to correct distortion are great, the corrective action can be made more effectively with a positive lens disposed on the object end. Hence the positive lens disposed at the object end avoids one problem, namely that the total length can not be shortened for effective correction of aberration. However, such a lens arrangement has the following disadvantages: The rays of light outside of an optical axis are excessively bent by the positive lens at the object end. This tends to increase astigmatism, comatic aberration, chromatic distortion aberration or chromatic coma aberration. Moreover, because it is necessary to increase the diameter of the first lens in view of the excessive inward bending of the rays of light, the front lens diameter tends to become greater than other lenses of the same angle of view.

An example of a retrofocus type lens with a positive lens disposed at the object end is disclosed in U.S. Pat. No. 3,877,795. Such a known lens arrangement, however, requires a plurality of negative meniscus lenses behind a positive meniscus lens. Further, the positive lens to be disposed next to the negative meniscus lenses is either a biconvex lens or a positive meniscus lens directing its convexed face toward an image of the object being photographed.

SUMMARY OF THE INVENTION

It is an object of this invention to provide a retrofocus type lens system having a wider angle of view with a larger aperture.

It is another object of this invention to provide a retrofocus type lens system which prevents the diameter of a lens on the object end of the lens system from increasing and which corrects various aberrations in spite of the shortness of its total length.

In accordance with this invention, a retrofocus type lens comprises a negative first lens group at the object end thereof, a positive second lens group and a positive third lens group. From the object end, the first lens group is composed of a positive meniscus lens with a convex surface facing the object to be photographed, then a negative meniscus lens with a convex surface facing the object, then a positive meniscus lens with a convex surface directed toward the object and then a negative meniscus lens with a convex face to the object. The second lens group is either composed of a positive cemented doublet lens consisting of a positive lens and a negative lens or is composed of a positive single lens. The third lens group is composed of seven lenses in the order of a positive lens having a face of a greater curvature on the object side, either a positive-and-negative cemented biconcave lens having a face of a greater curvature directed to an image of the object being photographed or a single biconcave lens, and either a positive-and-negative cemented positive meniscus lens having a convex face on the image end or a single positive meniscus lens and a positive lens. A diaphragm is disposed between the second and third lens groups.

According to a feature of the invention the first lens group is composed of a positive lens, a negative lens, another positive lens and another negative lens, each of these lenses being a single lens and each of them being in a meniscus shape with a convex surface of each facing the object end of the lens system. The first lens group is particularly characterized by the employment of a meniscus lens as the positive lens arranged third from the front to ensure effective correction of chromatic distortion aberration and chromatic coma aberration. It is another feature of the invention that, in the third lens group, an air lens is interposed in between the positive first lens and the biconcave second lens. The air lens has a negative meniscus shape with a convex surface facing an image of the object being photographed to ensure effective correction of spherical aberration and various aberrations that take place outside of the optical axis. The whole lens system may be either composed of single lenses only, as hereinafter will be shown as embodiment example in FIG. 7, or may be formed using cemented doublet lenses as will also be shown as other examples.

The above and further objects and novel features of the invention will more fully appear from the following detailed description taken in connection with the accompanying drawings in which:

BRIEF DESCRIPTION OF THE DRAWING

FIGS. 2A-2D are illustrations showing various aberrations of Example 1.

FIGS. 6A-6D are illustrations showing various aberrations of Example 3.

FIGS. 8A–8D are illustrations showing various aberrations of Example 4.

DETAILED DESCRIPTION OF PREFERRED EMBODIMENTS

Figure 1:
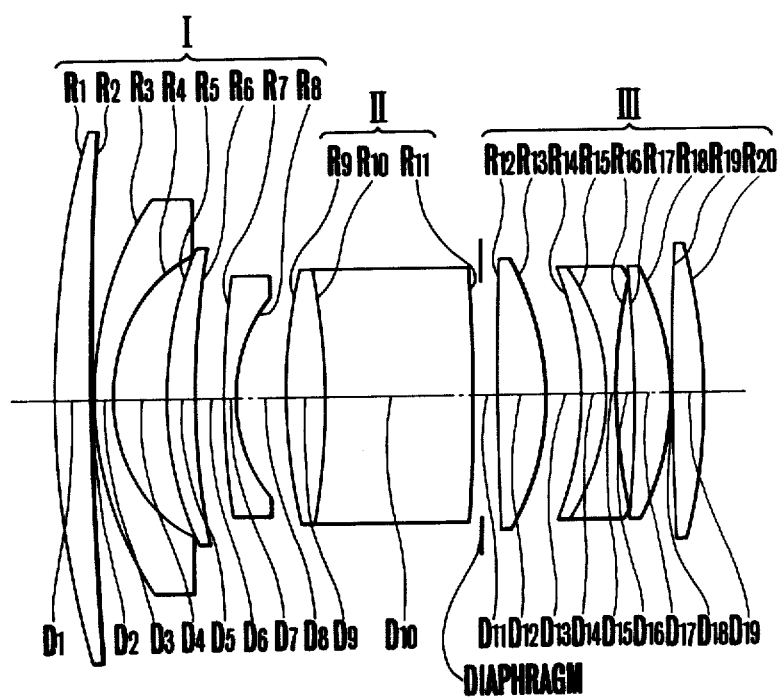
FIG. 1 is a sectional view showing a lens system representing Embodiment Example 1 of this invention.
Figure 3:
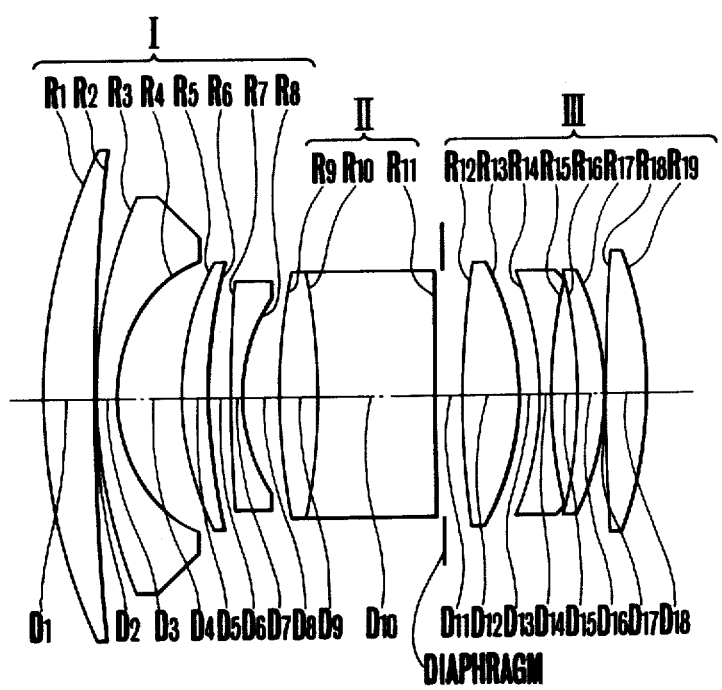
FIG. 3 is a sectional view showing a lens system representing Embodiment Example 2 of the invention.
Figure 4A:
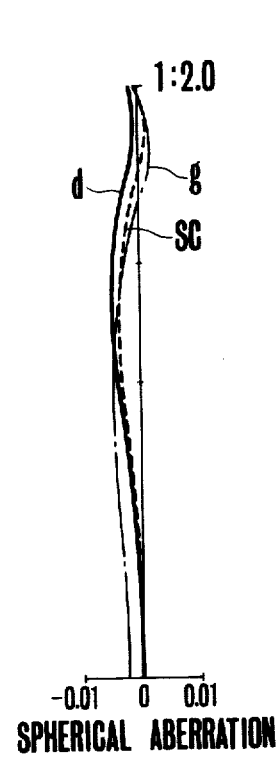
FIGS. 4A-4D are illustrations showing various aberrations of Example 2.
Figure 4B:
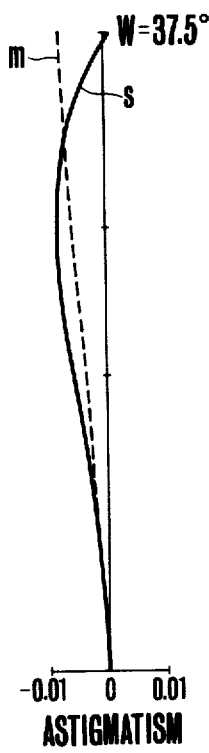
Figure 4C:
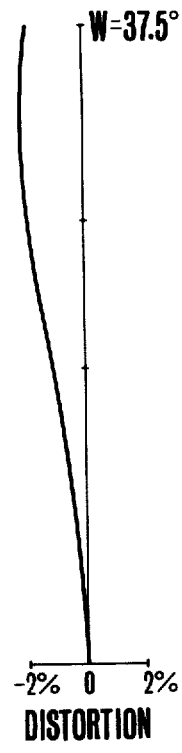
Figure 4D:
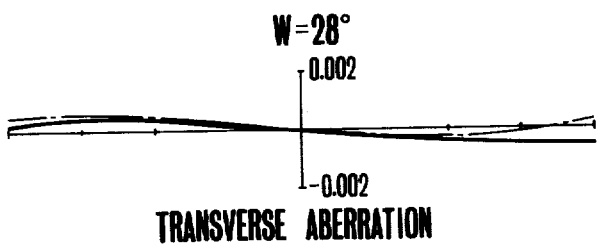
Figure 5:
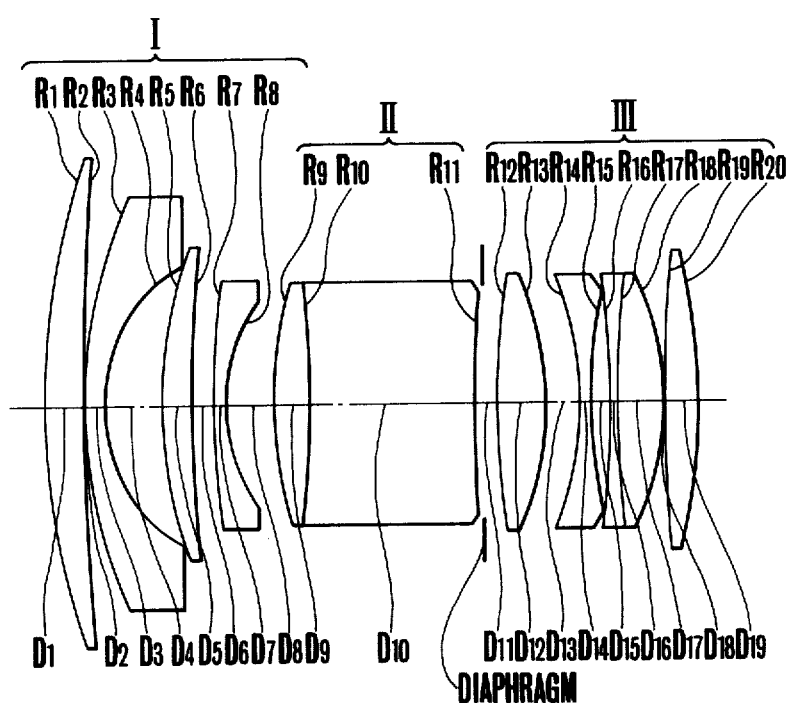
FIG. 5 is a sectional view showing a lens system representing embodiment Example 3 of the invention.
Figure 7:
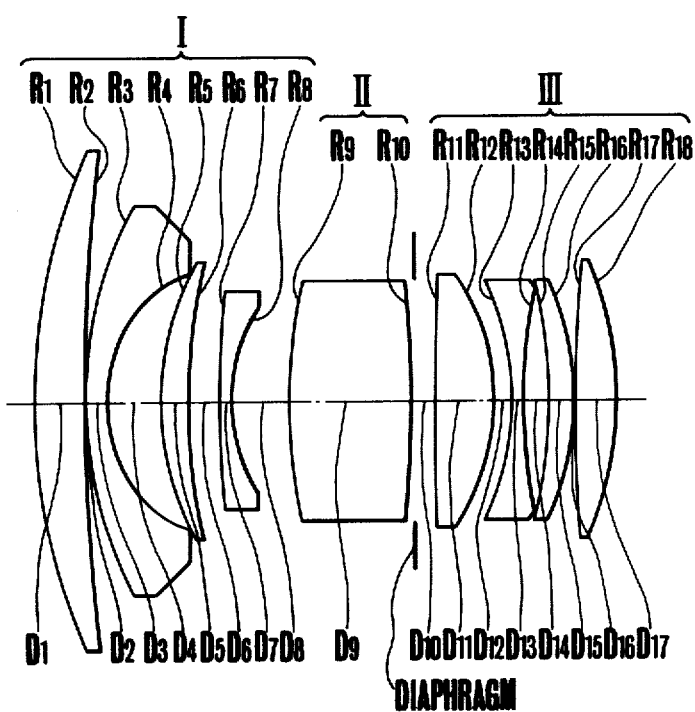
FIG. 7 is a sectional view showing a lens system representing embodiment Example 4 of the invention.

The lens arrangement of the invention as already described in the foregoing permits increase in lens aperture and reduction in lens size. For improved performance, however, it is preferable to add the following conditions to the lens arrangement already described:

(1) $0.8f < |fI| < 1.5f$—provided that $fI < 0$
(2) $1.5f < |fI, II| < 6.0f$—provided that FI, II, $< 0$
(3) $f1 > f3$
(4) $|f2| > |f4|$—provided that $f2 < 0$ and $f4 < 0$
(5) $\nu1 > \nu3$
(6) $0.32f < DII < 0.72f$ In the above conditions, f: Focal length of the total lens system
FI: Focal length of the first lens group
FI, II: Focal length of the first and second lens groups
f1: Focal length of the positive meniscus lens of the first lens group.
f2: Focal length of the negative meniscus lens of the first lens group disposed in the 2nd place from the front of the first lens group.
f3: Focal length of the positive meniscus lens of the first lens group disposed in 3rd place from the front of the first lens group
f4: Focal length of the negative meniscus lens of the first lens group disposed in 4th place from the front of the first lens group.
$\nu1$: Abbe number of the positive meniscus lens of the first lens group disposed in 1st place in the first lens group
$\nu3$: Abbe number of the positive meniscus lens of the first lens group disposed in 3rd place in the first lens group
DII: Lens thickness on the axis of the positive lens of the second lens group Of the above conditions, the conditions (1) and (2) determine the allocation of the basic refracting power of the lens system of the present invention. The condition (1) is necessary for ensuring a sufficient long back focal length for a lens usable in a single lens reflex camera and is required for keeping the front lens diameter small. If the upper limit value of this formula $0.8f < |fI| < 1.5f$ is exceeded, it would be difficult to obtain a sufficiently long back focal length and to hold the front lens diameter to a small value. On the other hand, if the lower limit value is further lowered, the positive spherical aberration including the high aberration which takes place at the first lens group increases. This makes it difficult to have a large lens aperture.

Conditions (2) is required for keeping the front lens diameter small by making the refracting power of the lens portions from the first lens face to the diaphragm relatively strong and divergent. If the upper limit value of the condition $1.5f < |fI, II| < 6$ is exceeded, the front lens diameter tends to increase. On the other hand, if the lower limit value of the condition is not reached, the positive refracting power of the third lens group must be made stronger. The stronger positive refracting power results in an increase in the negative spherical aberration in the third lens group and this makes a large lens aperture difficult.

It is a novel feature of the present invention that the first lens group is composed of, as already mentioned in the foregoing, a positive lens, a negative lens, another positive lens and another negative lens each having a meniscus shape and, in addition to that, the conditions (3) and (4) are applied to the lens arrangement under the condition (1). In other words, the rays of light impinging upon the first lens group outside of the optical axis are refracted by each lens and their incident height is gradually lowered. The refracting power is arranged to increase as the incident height gradually decreases in such a manner as to correct distortion by naturally refracting the rays of light outside of the optical axis. This arrangement ensures satisfactory correction of the various aberrations which take place outside of the optical axis. Thus, with these conditions satisfied, improvement can be effectively attained in the correction of astigmatism and comatic aberration.

The condition (5) is required for lessening chromatic distoration aberration and chromatic coma distortion at the positive lenses disposed in the first lens group. The condition defines the Abbe number of the positive third lens from the front and at which the incident height incident angle of off-axial rays is smaller than those of the positive lens disposed in the first place. Because of the smaller Abbe number in condition (5), chromatic aberration on the optical axis and magnification chromatic aberration are corrected for improvement in the correction of chromatic distortion aberration and chromatic coma aberration. Also, because the positive third lens from the front is formed into a meniscus shape, chromatic distortion aberration and chromatic coma aberration occur to a relatively lesser degree at this lens even when a glass material of high dispersion (or a small Abbe number) is used for this lens.

In accordance with the condition (6), the lens thickness of the positive lens of the second lens group is made relatively thick. This arrangement makes it possible to satisfactorily correct curvature of field and astigmatism. If the lower limit value of the condition $0.32f < DII < 0.72f$ is not reached, the curvature of field and astigmatism increase while, if the upper limit value thereof is exceeded, the front lens diameter tends to increase. Therefore, deviation from this condition is not desirable.

Further, for higher performance of the lens system, it is preferable to impose the following conditions upon the third lens group:

(7) $0.75 < (Ra/Rb) < 0.95$
(8) $0.7f < |Ra| < 1.2f$—provided that $Ra < 0$, i.e. convex face is directed toward the object.
(9) $1.7 < \overline{NIII}$ In the above conditions Ra: Radius of curvature of the face on the object side of the positive lens disposed in the 1st place in the third lens group
Rb: Radius of curvature of the face on the object side of the biconcave lens of the third lens group
NIII: Mean value of refractive indexes of the materials of all positive lenses included in the third lens group It is a novel feature of the third lens group that, with lenses arranged in order of positive lens, negative lens, positive lens and another positive lens, the aforementioned conditions (7) and (8) are imposed upon an air lens interposed between the first positive lens and the negative lens next disposed in such a way as to give the air lens a positive refracting power. The air lens is formed into a relatively strong meniscus shape with its convexed side disposed toward the image end. This arrangement makes it possible to obtain satisfactory conditions in terms of spherical aberration and various aberrations that take place outside of the optical axis.

The condition (7) defines a range of the ratios of radius of curvature of one side to the other of the air lens. If the lower limit value of the condition $0.75 < (-Ra/Rb) < 0.95$ not reach, the spherical aberration tends to be insufficiently corrected while the comatic aberration tends to be excessively corrected when the air lens is formed in a strong miniscus shape. On the other hand, if the upper limit value of the condition (7) is exceeded, the reverse tendency arises. In both cases, deviation from condition (7) makes it difficult to achieve a lens system with a large aperture.

Condition (8) is required so that the radius of curvature of the front of the air lens lies within the optimum range for correction of aberrations under the condition (7). If the lower limit value of the condition (8) $0.7f < |Ra| < 1.2f$ is not exceeded, a negative high spherical aberration would take place in this part. This is not desirable. Then, if the upper limit value of this condition is exceeded, correction of comatic aberrations would become insufficient. Hence deviation from the condition (8) is disadvantageous for correction of curvature of field and astigmatism.

Condition (9) is required to make the refracting power of the positive lenses in the third lens group relatively high for reducing the spherical aberration and the curvature of field in the third lens group. Deviation from this condition is disadvantageous for satisfactory correction of spherical aberration and the curvature of field. Also, the value of $\overline{NIII}$ is normally less than 1.9. Examples of preferred embodiments the present invention are given in the following values. In Example 1, $f=24$, $F1=2.0$ and $\omega=42°$. In Example 2, $f=28$, $F1=2.0$ and $\omega=37.5°$. In Example 3, $f=24$, $F1=2.0$ and $\omega=42°$. In Example 4, $f=28$, $F1=2.0$ and $\omega=37.5°$. In these examples, the values are converted into $f=1$; R represents radius of curvature; D represents spacing between lenses; Nd represents a refractive index for a ray d; and $\nu d$ represents an Abbe number for the ray d.

Moreover, for the purpose of preventing degradation of images of nearby objects, the following examples of embodiments employ a method of correcting aberrations by expanding the distance between faces R6 and R7 when the whole lens system is drawn out forward for focusing on such objects.

Example 1

| Face No. | R | D | Nd | νd |
|---|---|---|---|---|
| 1 | 3.4178 | 0.1346 | 1.58913 | 61.1 |
| 2 | 14.7626 | 0.0082 | | |
| 3 | 1.2691 | 0.0612 | 1.68893 | 31.1 |
| 4 | 0.5642 | 0.1892 | | |
| 5 | 1.3099 | 0.0979 | 1.59551 | 39.2 |
| 6 | 2.8093 | 0.0938 | | |
| 7 | 2.6138 | 0.0408 | 1.58913 | 61.1 |
| 8 | 0.5419 | 0.1744 | | |
| 9 | 1.8876 | 0.1306 | 1.80518 | 25.4 |
| 10 | −2.9555 | 0.5203 | 1.62041 | 60.3 |
| 11 | −6.9175 | 0.0816 | | |
| 12 | 19.2176 | 0.1714 | 1.804 | 46.6 |
| 13 | −0.9078 | 0.1212 | | |
| 14 | −1.1481 | 0.0857 | 1.6968 | 55.5 |
| 15 | −0.7869 | 0.0408 | 1.80518 | 25.4 |
| 16 | 2.0960 | 0.0551 | | |
| 17 | −4.8410 | 0.1265 | 1.6968 | 55.5 |
| 18 | −0.9381 | 0.0061 | | |
| 19 | 11.8518 | 0.1102 | 1.7725 | 49.6 |
| 20 | −2.0774 | | | |

$\Sigma D = 2.2496$

Example 2

| Face No. | R | D | Nd | νd |
|---|---|---|---|---|
| 1 | 1.7125 | 0.1509 | 1.58913 | 61.1 |
| 2 | 7.2659 | 0.0070 | | |
| 3 | 1.4893 | 0.0526 | 1.54869 | 45.6 |
| 4 | 0.4495 | 0.1937 | | |
| 5 | 0.8255 | 0.0842 | 1.8061 | 40.9 |
| 6 | 1.6042 | 0.0681 | | |
| 7 | 4.2025 | 0.0351 | 1.59551 | 39.2 |
| 8 | 0.5165 | 0.1084 | | |
| 9 | 1.9171 | 0.1158 | 1.80518 | 25.4 |
| 10 | −1.8670 | 0.3538 | 1.54869 | 45.6 |
| 11 | ∞ | 0.0772 | | |
| 12 | 2.6999 | 0.1719 | 1.7725 | 49.6 |
| 13 | −0.7704 | 0.0616 | | |
| 14 | −0.9343 | 0.0351 | 1.80518 | 25.4 |
| 15 | 1.5313 | 0.0766 | | |
| 16 | −1.6006 | 0.0807 | 1.6968 | 55.5 |
| 17 | −0.8102 | 0.0053 | | |
| 18 | 8.2287 | 0.1193 | 1.6968 | 55.5 |
| 19 | −1.1918 | | | |

$\Sigma D = 1.7973$

Example 3

| Face No. | R | D | Nd | νd |
|---|---|---|---|---|
| 1 | 2.5255 | 0.1385 | 1.60311 | 60.7 |
| 2 | 12.0690 | 0.0081 | | |
| 3 | 1.7340 | 0.0611 | 1.64769 | 33.8 |
| 4 | 0.5646 | 0.2034 | | |
| 5 | 1.7074 | 0.0977 | 1.51742 | 52.3 |
| 6 | 5.5931 | 0.0774 | | |
| 7 | 3.6731 | 0.0407 | 1.60311 | 60.7 |
| 8 | 0.6413 | 0.1589 | | |
| 9 | 1.4160 | 0.1222 | 1.80518 | 25.4 |
| 10 | −4.4086 | 0.5701 | 1.60311 | 60.7 |
| 11 | 5.0857 | 0.0815 | | |
| 12 | 2.8280 | 0.1711 | 1.804 | 46.6 |
| 13 | −1.0858 | 0.1173 | | |
| 14 | −1.1667 | 0.0391 | 1.80518 | 25.4 |
| 15 | 1.8444 | 0.054 | | |
| 16 | −5.5811 | 0.0407 | 1.80518 | 25.4 |
| 17 | 4.0765 | 0.1581 | 1.6968 | 55.5 |
| 18 | −0.9331 | 0.0061 | | |
| 19 | 6.3838 | 0.1100 | 1.7725 | 49.6 |
| 20 | −2.3104 | | | |

$\Sigma D = 2.2564$

Example 4

| Face No. | R | D | Nd | νd |
|---|---|---|---|---|
| 1 | 1.9079 | 0.1509 | 1.6935 | 53.2 |
| 2 | 6.6761 | 0.0070 | | |
| 3 | 1.2535 | 0.0526 | 1.53172 | 48.9 |
| 4 | 0.4221 | 0.1601 | | |
| 5 | 0.8363 | 0.0842 | 1.8061 | 40.9 |
| 6 | 1.6640 | 0.0940 | | |
| 7 | 3.5789 | 0.0351 | 1.58921 | 41.1 |
| 8 | 0.5181 | 0.1686 | | |
| 9 | 1.5972 | 0.3611 | 1.80518 | 25.4 |
| 10 | −4.6263 | 0.0772 | | |
| 11 | 36.1202 | 0.1719 | 1.7725 | 49.6 |
| 12 | −0.7118 | 0.0558 | | |
| 13 | −0.7948 | 0.0351 | 1.80518 | 25.4 |
| 14 | 1.7791 | 0.0714 | | |
| 15 | −1.5582 | 0.0807 | 1.6968 | 55.5 |
| 16 | −0.8083 | 0.0053 | | |
| 17 | 8.4093 | 0.1193 | 1.6968 | 55.5 |

-continued

Example 4

| Face No. | R | D | Nd | νd |
|---|---|---|---|---|
| 18 | −1.0326 | | | |

ΣD = 1.7303

Aberration Coefficients of Example 1

| Face No. | I | II | III | P | V |
|---|---|---|---|---|---|
| 1 | 0.0058 | 0.0152 | 0.0396 | 0.1084 | 0.3854 |
| 2 | 0.0003 | −0.0045 | 0.0721 | −0.0251 | −0.7545 |
| 3 | 0.0410 | 0.0353 | 0.0304 | 0.3213 | 0.3028 |
| 4 | −3.4521 | 0.7258 | −0.1526 | −0.7228 | 0.1840 |
| 5 | 0.8975 | 0.2039 | 0.0463 | 0.2848 | 0.0752 |
| 6 | −0.0989 | −0.1061 | −0.1137 | −0.1328 | −0.2642 |
| 7 | 0.1171 | 0.1216 | 0.1263 | 0.1417 | 0.2784 |
| 8 | −12.8269 | 0.5760 | −0.0259 | −0.6839 | 0.0319 |
| 9 | 4.3994 | 0.9086 | 0.1876 | 0.2362 | 0.0875 |
| 10 | −0.0007 | 0.0028 | −0.0122 | 0.0214 | −0.0393 |
| 11 | −0.0117 | −0.0397 | −0.1347 | 0.0553 | −0.2689 |
| 12 | 0.1149 | 0.1540 | 0.2064 | 0.0232 | 0.3077 |
| 13 | 14.0525 | −2.2901 | 0.3732 | 0.4908 | −0.1408 |
| 14 | −7.6215 | 1.3777 | −0.2490 | −0.3576 | 0.1097 |
| 15 | −1.0424 | 0.0726 | −0.0051 | −0.0449 | 0.0035 |
| 16 | −1.3389 | −0.9363 | −0.6548 | −0.2127 | −0.6067 |
| 17 | 0.0356 | 0.0926 | 0.2410 | −0.0848 | 0.4066 |
| 18 | 3.6939 | −0.4358 | 0.0514 | 0.4376 | −0.0577 |
| 19 | −0.0139 | 0.0398 | −0.1137 | 0.03676 | 0.2200 |
| 20 | 3.8359 | −0.5523 | 0.0795 | 0.2097 | −0.0416 |
| Σ | 0.7867 | −0.0391 | −0.0078 | 0.1026 | 0.2188 |

I : Spherical aberration
II : Comatic aberration
III : Astigmatism
P : Petzval's sum
V : Distortion

Aberration Coefficients of Example 2

| Face No. | I | II | III | P | V |
|---|---|---|---|---|---|
| 1 | 0.0464 | 0.0437 | 0.0410 | 0.2165 | 0.2420 |
| 2 | 0.0022 | −0.0186 | 0.1578 | −0.0510 | −0.9058 |
| 3 | −0.0009 | −0.0019 | −0.0039 | 0.2379 | 0.4773 |
| 4 | −5.1746 | 1.1778 | −0.2681 | −0.7882 | 0.2404 |
| 5 | 2.3155 | 0.2231 | 0.0215 | 0.5407 | 0.0542 |
| 6 | −0.0782 | −0.0848 | −0.0919 | −0.2782 | −0.4010 |
| 7 | 0.0053 | 0.0174 | 0.0577 | 0.0888 | 0.4857 |
| 8 | −10.4518 | −0.1750 | −0.0029 | −0.7226 | −0.0121 |
| 9 | 2.7316 | 0.8750 | 0.2803 | 0.2327 | 0.1643 |
| 10 | 0.0013 | −0.0021 | 0.0036 | 0.0491 | −0.0894 |
| 11 | −0.0543 | −0.1016 | −0.1898 | 0. | −0.3548 |
| 12 | 0.4276 | 0.3794 | 0.3367 | 0.1614 | 0.4419 |
| 13 | 14.6903 | −2.4298 | 0.4019 | 0.5657 | −0.1600 |
| 14 | −9.8520 | 1.8126 | −0.3335 | −0.4774 | 0.1492 |
| 15 | −0.9443 | −0.7577 | −0.6080 | −0.2913 | −0.7216 |
| 16 | 0.0146 | −0.0306 | 0.0638 | −0.2566 | 0.4025 |
| 17 | 1.9134 | −0.4121 | 0.0888 | 0.5068 | −0.1283 |
| 18 | 0. | −0.0011 | −0.393 | 0.0499 | 0.3678 |
| 19 | 5.0984 | −0.5391 | 0.0570 | 0.3446 | −0.0425 |
| Σ | 0.6904 | −0.0254 | −0.0273 | 0.1288 | 0.2098 |

Aberration Coefficients of Example 3

| Face No. | I | II | III | P | V |
|---|---|---|---|---|---|
| 1 | 0.0348 | 0.0400 | 0.0461 | 0.2146 | 0.3002 |
| 2 | 0.0018 | −0.0173 | 0.1629 | −0.0613 | −0.9574 |
| 3 | 0.0059 | 0.0081 | 0.0112 | 0.2769 | 0.3986 |
| 4 | −5.7083 | 1.3324 | −0.3110 | −0.8224 | 0.2645 |
| 5 | 2.0502 | 0.2187 | 0.0233 | 0.5336 | 0.594 |
| 6 | −0.0599 | −0.0726 | −0.0879 | −0.2682 | −0.4314 |
| 7 | 0.0063 | 0.0194 | 0.0599 | 0.1035 | 0.5036 |
| 8 | −8.9145 | −0.4398 | −0.0217 | −0.7156 | −0.0363 |
| 9 | 2.9700 | 1.0408 | 0.3647 | 0.2792 | 0.2256 |
| 10 | −0.0005 | 0.0052 | −0.0470 | 0.0964 | −0.4455 |
| 11 | 0.0076 | 0.0286 | 0.1065 | 0.0120 | 0.4415 |
| 12 | 14.9082 | −2.4032 | 0.3873 | 0.6123 | −0.1611 |
| 13 | −11.1977 | 1.8699 | −0.3122 | −0.5611 | 0.1458 |
| 14 | −0.9638 | −0.7995 | −0.6631 | −0.2507 | −0.7580 |
| 15 | 0.0133 | −0.0385 | 0.1110 | −0.2635 | 0.4392 |
| 16 | 1.3884 | −0.3452 | 0.0859 | 0.5080 | −0.1477 |
| 17 | 0.0004 | 0.0029 | 0.0182 | 0.0488 | 0.4112 |
| 18 | 6.2053 | 0.4688 | 0.0354 | 0.3977 | −0.0327 |
| Σ | 0.7476 | −0.0187 | −0.0302 | 0.1403 | 0.2195 |

Aberration Coefficients of Example 4

| Face No. | I | II | III | P | V |
|---|---|---|---|---|---|
| 1 | 0.0145 | 0.0248 | 0.0424 | 0.1489 | 0.3267 |
| 2 | 0.0011 | 0.0113 | 0.1149 | −0.0311 | −0.8482 |
| 3 | 0.0019 | 0.0040 | 0.0080 | 0.2266 | 0.4724 |
| 4 | −3.5841 | 0.7717 | −0.1661 | −0.6961 | 0.1856 |
| 5 | 0.6523 | 0.2078 | 0.0662 | 0.1997 | 0.0847 |
| 6 | −0.0637 | 0.0877 | −0.1206 | −0.0609 | −0.2496 |
| 7 | 0.1133 | 0.1239 | 0.1354 | 0.1024 | 0.2601 |
| 8 | −10.6222 | 0.3468 | −0.0113 | −0.5866 | 0.0195 |
| 9 | 5.9740 | 0.8099 | 0.1098 | 0.3150 | 0.0575 |
| 10 | −0.0001 | 0.0013 | −0.0101 | 0.0158 | −0.0439 |
| 11 | −0.4252 | −0.3400 | −0.2718 | −0.0739 | −0.2765 |
| 12 | 0.9278 | 0.5893 | 0.3743 | 0.1575 | 0.3379 |
| 13 | 9.1012 | −1.8667 | 0.3828 | 0.4104 | −0.1627 |
| 14 | −6.7447 | 1.3467 | −0.2689 | −0.3823 | 0.1300 |
| 15 | −1.4995 | −0.9970 | −0.6629 | −0.2418 | −0.6016 |
| 16 | 0.0517 | 0.1191 | 0.2742 | −0.0799 | 0.4474 |
| 17 | −0.1353 | −0.0883 | −0.0576 | −0.0086 | −0.0433 |
| 18 | 3.5191 | −0.4224 | 0.0507 | 0.4401 | −0.0589 |
| 19 | −0.0013 | 0.0113 | −0.0967 | 0.0682 | 0.2420 |
| 20 | 3.4205 | −0.5512 | 0.0888 | 0.1886 | −0.0447 |
| Σ | 0.7012 | −0.0078 | −0.0182 | 0.1120 | 0.2346 |

| Conditions | Ex. 1 | Ex. 2 | Ex. 3 | Ex. 4 |
|---|---|---|---|---|
| $0.8f < |f1| < 1.5f$ | 0.8471f | 0.9452f | 0.8463f | 1.0144f |
| $1.5f < |f1\ II| < 6.0f$ | 1.8923f | 2.3389f | 1.7972f | 5.5402f |
| $f1 > f3$ | 7.516 > 4.02 | 3.765 > 2.013 | 5.267 > 4.709 | 3.803 > 1.995 |
| $|f2| > |f4|$ | 1.529 > 1.169 | 1.195 > 0.992 | 1.320 > 1.295 | 1.234 > 1.033 |
| $\nu 1 > \nu 3$ | | | | |
| $0.32f < DII < 0.72f$ | 0.6509f | 0.4696f | 0.6923f | 0.3611f |
| $0.75 < \frac{Ra}{Rb} < 0.95$ | 0.7907 | 0.8246 | 0.9307 | 0.8956 |
| $0.7f < |Ra| < 1.2f$ | 0.9078f | 0.7704f | 1.0858f | 0.7118f |
| $1.7 < \overline{NIII}$ | 1.7425 | 1.7220 | 1.75776 | 1.7220 |

What is claimed is:

1. A retrofocus type wide-angle objective lens comprising:
   a divergent first lens group including in the indicated order a first positive meniscus lens having a convex face directed toward an object to be photographed, a second negative meniscus lens having a convex face directed toward the object, a third positive meniscus lens having a convex face directed toward the object and a fourth negative meniscus lens also having a convex face directed toward the object;
   a convergent second lens group behind the first lens group and coaxial therewith and including a positive lens having a convex front lens face directed toward the object;
   a convergent third lens group behind the second lens group and coaxial therewith and including in the indicated order a positive lens having a convex rear lens face directed toward an image of the object being photographed, a biconcave lens, a positive meniscus lens directing a convexed face to the image and a positive lens; and
   a diaphragm disposed between the second and third lens groups.

2. A wide-angle objective lens according to claim 1, wherein the positive lens of said second lens group includes positive and negative lenses cemented to each other.

3. A wide-angle objective lens according to claim 1, wherein the biconcave lens of said third lens group includes positive and negative lenses cemented to each other.

4. A wide-angle objective lens according to claim 1, wherein the positive meniscus lens of said third lens group includes positive and negative lenses cemented to each other.

5. A lens as in claim 1, wherein the distance between the third positive meniscus lens and the fourth negative meniscus lens changes during focusing.

* * * * *